United States Patent
Randle

[19]

[11] Patent Number: 6,065,244
[45] Date of Patent: May 23, 2000

[54] PLANT SPRAY SHIELD METHOD

[76] Inventor: John B. Randle, 228 Shady Oaks Cir., Lake Mary, Fla. 32746

[21] Appl. No.: 08/928,163

[22] Filed: Sep. 12, 1997

[51] Int. Cl.[7] .................................................. A01B 79/00
[52] U.S. Cl. ............................. 47/58; 47/1.7; 47/41.01
[58] Field of Search .................... D7/700; 47/1.7, 47/1.5, 41.01, 41.15, 58

[56] References Cited

U.S. PATENT DOCUMENTS

| | | |
|---|---|---|
| 1,598,628 | 9/1926 | Walker, Jr. . |
| 2,812,784 | 11/1957 | Palmer . |
| 3,267,610 | 8/1966 | Hills . |
| 3,374,897 | 3/1968 | Martin ................ 210/455 |
| 4,199,896 | 4/1980 | Lehman ................ 47/1.7 |
| 4,204,365 | 5/1980 | Hirvi ................ 47/41.01 |
| 4,223,477 | 9/1980 | Abernathy ................ 47/1.7 |
| 5,009,369 | 4/1991 | Iwaszkowiec ................ 47/1.7 |
| 5,060,417 | 10/1991 | Court ................ 47/41.01 |
| 5,070,644 | 12/1991 | Hasty ................ 47/41.01 |
| 5,196,065 | 3/1993 | Jozwiak ................ 118/504 |
| 5,293,713 | 3/1994 | Ahmed ................ 47/41.01 |
| 5,329,727 | 7/1994 | Dixon ................ 47/1.5 |
| 5,499,474 | 3/1996 | Knooihuizen ................ 47/1.5 |
| 5,606,822 | 3/1997 | Dearhammer ................ 47/1.7 |
| 5,787,638 | 8/1998 | Harshman ................ 47/41.01 |

*Primary Examiner*—Michael J. Carone
*Assistant Examiner*—Joanne C. Downs
*Attorney, Agent, or Firm*—William M. Hobby, III

[57] ABSTRACT

A plant spray shield for spraying a plant with a chemical, such as a weed killer, has a generally funnel shaped body having an elongated slot extending along one side thereof to allow elongated plant stems and leaves to be inserted into the funnel shaped body through the slot. A handle is attached to the body for holding the body around the plant so that the plant held in the spray shield is isolated while spraying the plant with a chemical to shield other desirable flora and fauna from the sprayed chemicals. The handle is generally L-shaped and the body and handle are molded as a one piece unit. The handle is positioned about 90° from the elongated slot in the body to position the handle away from the direction of the spray being sprayed on the plant. A method is provided for selecting the plant spray shield in accordance with the apparatus, inserting plant stems into the removed slotted portion in the body, and spraying a chemical onto the inserted plant stems and/or leaves.

2 Claims, 1 Drawing Sheet

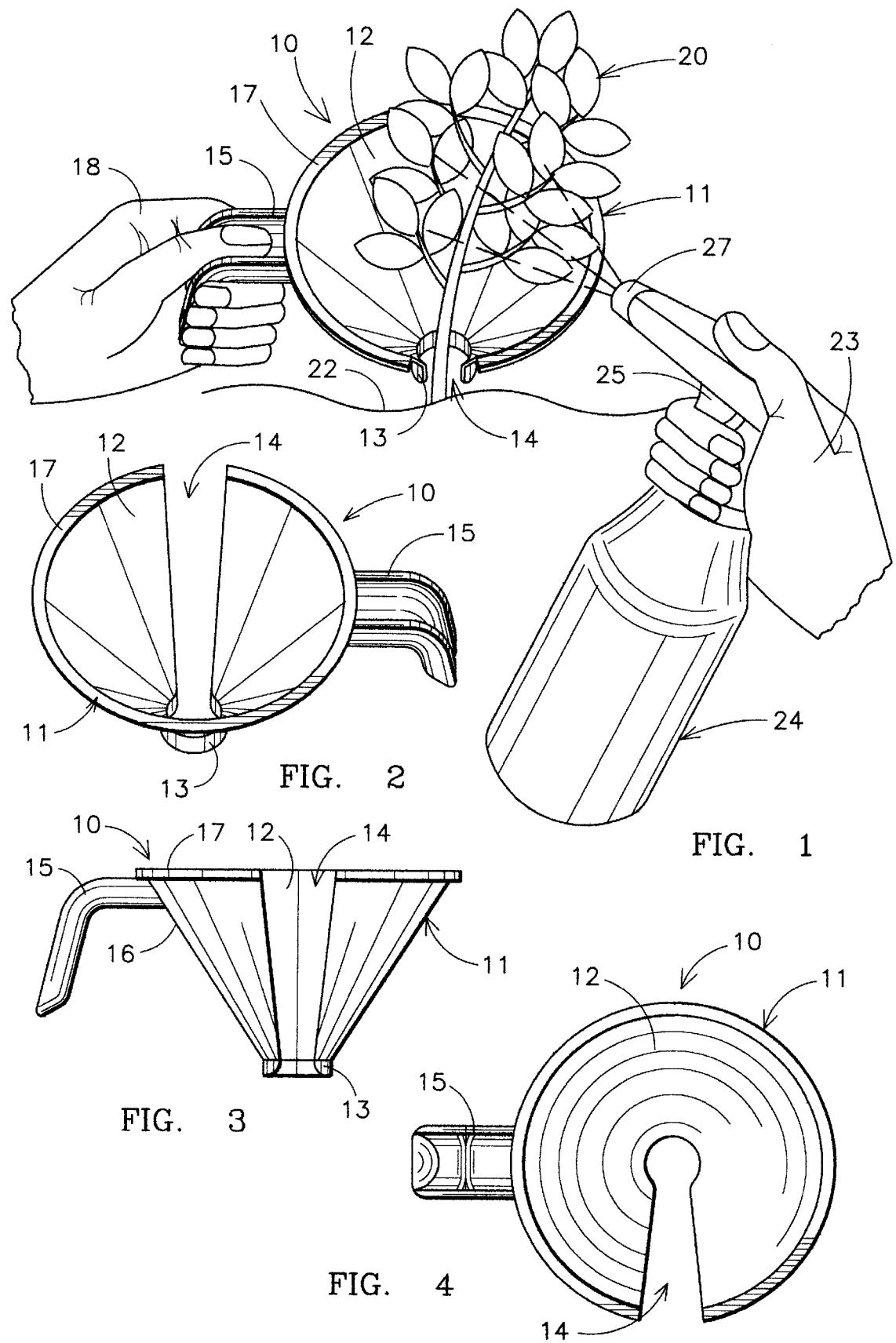

PLANT SPRAY SHIELD METHOD

BACKGROUND OF THE INVENTION

The present invention relates to a plant spray shield for spraying a plant with a chemical and with a method of spraying a plant with a chemical, especially for spraying a herbicide onto a plant while shielding a surrounding area from the herbicide.

In the past, there have been a variety of complex devices for applying chemicals to specific plants while blocking the surrounding area from the chemicals being sprayed. Herbicides are used to kill undesirable plants and weeds and all provided to the home gardener with directional spray an indiscrimnate wide angle nozzle for spraying or applying directly to a plant. However, when the plant is sprayed, the herbicide is deposited on any adjacent plants and damages or kills the adjacent plants or foliage. The present invention is directed towards a hand-held plant shield which can effectively and easily contain and isolate a weed or undesirable plant during the spraying of a herbicide while protecting adjacent or nearby desirable foliage.

A typical prior art applicator for applying a chemical to a plant may be seen in the Knooihuizen U.S. Pat No. 5,499,474, for a method and apparatus for liquid application which has a bottle and pump for pumping a liquid solution through a conduit into a hand-held applicator. The applicator has opposing pads which can be clamped onto a plant for applying the chemical thereto. The Dearhammer U.S. Pat. No. 5,606,822, is for plant cutting shears combined with a chemical applicator. A resilient fluid absorbing element holds a quantity of a herbicide or other chemical approximate the cutting blade of the shear for use in making direct fluid applying contact with the clipped plant portion. The Dixon U.S. Pat. No. 5,329,727, is a topical herbal treatment applicator for the application of a liquid treatment fluid to a plant which has opposing grasping or pressure plates for grasping the plant with a sponge or pad which directs the treatment of fluid onto the plant. In the Lehman U.S. Pat. No. 4,199,896, a controlled area boom sprayer is used for applying herbicides and includes a boom arm of changing length and angular position which carries a bell-shaped sprayer hood which is positioned with a sensing element to guide the boom so that the desired spray pattern is sprayed directly over a row of trees or bushes. The Hills U.S. Pat. No. 3,267,610, also shows an automatic sprayer supported on a boom arm which has a shielding surface placed in front of the nozzle. The Walker, Jr. U.S. Pat. No. 1,598,628, shows a hood having flexible coating elements therein for moving across plants or the like. In the Jozwiak U.S. Pat. No. 5,196,065, a garden spray shield apparatus includes a flat, flexible or rigid vertical wall defining a conduit for providing protection to desired vegetation where the conduit surrounds unwanted vegetation for applying a herbicide spray to shield adjacent plants from the spray. The T. H. Palmer U.S. Pat. No. 2,812,784, is for a multipurpose pan.

The present invention relates to a one-piece manual garden spray shield which is placed around undesirable vegetation for spraying a herbicide thereon while protecting surrounding desirable vegetation. A generally funnel shaped shield has an elongated slot along one side and a handle along another side so that the shield can be quickly placed over the side of a plant stem and held in position while hand spraying the plant to thereby shield the surrounding vegetation in the application of a herbicide and thus simplify the application and shielding of a plant while utilizing an inexpensive plant shield.

SUMMARY OF THE INVENTION

A plant spray shield for spraying a plant with a chemical, such as a herbicide, has a generally funnel shaped body having an elongated slot extending along one side thereof to allow an elongated plant stem to be inserted into the funnel shaped body through the slot. A handle is attached to the body for holding the body upright around a plant being sprayed. The plant spray shield protects other flora and fauna from the sprayed chemicals. The handle is generally L-shape and the body and handle are molded as a one piece unit. The handle is positioned about 90° from the elongated slot in the body to place the handle away from the direction of the spray being sprayed on the plant. A method is provided for selecting the plant spray shield in accordance with the apparatus, inserting plant stems or leaves into the removed slotted portion in the body, and spraying a chemical onto the inserted plant stems and leaves.

BRIEF DESCRIPTION OF THE DRAWINGS

Other objects, features, and advantages of the present invention will be apparent from the written description and the drawings in which:

FIG. 1 is a perspective view of a plant spray shield in accordance with the present invention being held on a plant while being sprayed;

FIG. 2 is a top perspective view of the plant spray shield of FIG. 1;

FIG. 3 is a side elevation of the plant spray shield of FIGS. 1 and 2; and

FIG. 4 is a top plan view of the spray shield of FIGS. 1–3.

DESCRIPTION OF THE PREFERRED EMBODIMENT

Referring to the drawings, FIGS. 1–3, a plant spray shield 10 is used for spraying a plant with a chemical, such as a herbicide, and includes a generally funnel shaped body 11 which can have a generally cone-shaped portion 12 connected to a generally cylindrical portion 13. The funnel shaped body 11 has an elongated slot 14 extending the length of the body 11 through the truncated cone portion 12 and bottom cylindrical portion 13. The spray shield 10 also has a handle 15 which is attached to the exterior side 16 below the top edge 17 of the funnel shaped body 11 and positioned approximately 90° from the center of the elongated slot 14 or approximately halfway between the slot 14 and the area directly across from the slot 14. When the shield 10 handle 15 is held by a person's hand 18, it is positioned to one side of the direction being sprayed, as shown in FIG. 1.

The method for using the plant spray shield is illustrated in FIG. 1 in which the spray shield 10 is held in the hand 18 and has been placed over a plant 20. The plant 20 can be an undesirable vegetation, such as a weed, in which the stem and/or leaves 21 of the weed have been slipped through the slot 14 while the shield 10 is held in an upright position. The cylindrical portion 13 of the body 11 can be seen positioned over the stem 21 just above the ground 22. A person's hand 23 is holding a spray bottle which may be filled with a chemical, such as a herbicide. The hand is grasping the trigger 25 and spraying the herbicide or other chemical 26 through the nozzle 27 of the spray container 24 directly onto the weed 20 held in the spray shield 10. Thus, the hand 18 holding the handle 15 is positioned out of the way of the spray and is shielded by the spray shield body 11 since the spraying is performed from the general direction of the slot 14 and towards the opposite side of the shield 10. The spray shield 10 can then be removed by sliding the weed 20 out of the slot 14 or by merely pulling the shield 10 directly upwards to further disperse the coated weed 20 with the herbicide that has been sprayed thereon. The plant spray shield 10 may be molded as a one unit of a polymer or plastic material, as illustrated, and can be easily manufactured and used by a home gardener.

It should be clear that the plant spray shield for spraying a plant with a herbicide or the like and a method of spraying a plant with a chemical herbicide or the like has been illustrated. However, it should also be clear that the funnel shape does not have to be of a truncated cone or round shape, as shown, which is to be considered illustrative rather than restrictive.

I claim:

1. A method of spraying a plant with a chemical comprising the steps of:

- selecting a generally funnel shaped body having at least one side and top and bottom portions and an elongated removed portion along one side thereof and extending through said top and bottom portions, said body having a handle extending from the side of said generally funnel shaped body and being attached thereto for holding said body with a human hand;
- inserting a plant stem through said removed portion in said body and into said generally funnel shaped body; and
- spraying a chemical onto said inserted plant stem to thereby spray said plant stem and leaves while shielding the surrounding area.

2. A method of spraying a plant with a chemical in accordance with claim 1 including the step of spraying said plant stem with a weed killer.

* * * * *